US010071763B2

(12) United States Patent
Furukawa et al.

(10) Patent No.: US 10,071,763 B2
(45) Date of Patent: Sep. 11, 2018

(54) ELECTRIC POWER STEERING DEVICE

(71) Applicant: Mitsubishi Electric Corporation, Tokyo (JP)

(72) Inventors: Akira Furukawa, Tokyo (JP); Akihiko Mori, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/566,845

(22) PCT Filed: Aug. 28, 2015

(86) PCT No.: PCT/JP2015/074415
§ 371 (c)(1),
(2) Date: Oct. 16, 2017

(87) PCT Pub. No.: WO2015/037779
PCT Pub. Date: Aug. 28, 2015

(65) Prior Publication Data
US 2018/0079449 A1    Mar. 22, 2018

(51) Int. Cl.
*B62D 6/00* (2006.01)
*B62D 5/04* (2006.01)

(52) U.S. Cl.
CPC .......... *B62D 5/0484* (2013.01); *B62D 5/046* (2013.01); *B62D 5/0487* (2013.01)

(58) Field of Classification Search
CPC .... B62D 5/0484; B62D 5/046; B62D 5/0487; B62D 5/0463; H02H 7/0844
(Continued)

(56) References Cited

U.S. PATENT DOCUMENTS 6,652,238 B2 * 11/2003 Kajiwara ............... F04C 28/08
                                                       417/44.1
6,755,276 B2 *  6/2004 Clephas ................. B62D 5/003
                                                       180/402
(Continued)

FOREIGN PATENT DOCUMENTS

JP    2011-78221 A    4/2011
JP    2011-78230 A    4/2011
(Continued)

OTHER PUBLICATIONS

International Search Report for PCT/JP2015/074415, dated Nov. 2, 2015.
(Continued)

*Primary Examiner* — Shardul D Patel
(74) *Attorney, Agent, or Firm* — Sughrue Mion, PLLC; Richard C. Turner

(57) ABSTRACT

The invention includes an electric motor that causes a vehicle steering device to rotate, and a control unit that controls the electric motor, wherein the electric motor has a stator including two independent sets of coil winding group, the control unit has a control portion that computes and outputs a control amount and a drive circuit that independently drives each winding group of the electric motor, and the control portion detects a multiple of failures, categorizes the failures into at least two kinds of failure mode, continues control on a normal side after detecting a first failure, and continues control by employing a set in which control nearer to that at a normal time can be carried out, including a past failure, when detecting a second or subsequent failure.

7 Claims, 7 Drawing Sheets

(58) Field of Classification Search
USPC .................. 701/43, 41; 180/443, 446, 402; 318/400.21, 400.02
See application file for complete search history.

(56) References Cited

U.S. PATENT DOCUMENTS

| | | | | |
|---|---|---|---|---|
| 2011/0074323 | A1* | 3/2011 | Mukai | B62D 5/0463 318/400.21 |
| 2011/0074333 | A1* | 3/2011 | Suzuki | B62D 5/0403 318/724 |
| 2011/0156627 | A1 | 6/2011 | Nakamura et al. | |
| 2013/0200827 | A1* | 8/2013 | Kezobo | H02P 29/0241 318/400.21 |
| 2015/0298727 | A1* | 10/2015 | Kimpara | B62D 5/0484 701/43 |
| 2016/0118923 | A1* | 4/2016 | Kano | H02P 25/22 318/400.02 |
| 2016/0134212 | A1* | 5/2016 | Kikuchi | B62D 5/0484 318/400.21 |
| 2016/0200355 | A1* | 7/2016 | Mori | B62D 5/0484 180/446 |

FOREIGN PATENT DOCUMENTS

| | | |
|---|---|---|
| JP | 2012-111474 A | 6/2012 |
| JP | 2013-31331 A | 2/2013 |
| JP | 2013-162680 A | 8/2013 |

OTHER PUBLICATIONS

Communication dated Jul. 3, 2018 from the Japanese Patent Office in counterpart application No. 2017-537049.

* cited by examiner

| PHASE | REGION | FAILURE MODE |
|---|---|---|
| Add1 | EXAMPLE: SET 1 | 14U | FIRST FAILURE MODE |
| Add2 | EXAMPLE: SET 1 | 15U | FIRST FAILURE MODE |
| Add3 | EXAMPLE: SET 2 | 6b | SECOND FAILURE MODE |
| Add4 | EXAMPLE: SET 2 | 15V | SECOND FAILURE MODE |

——— Iv1    - - - - Iw1

— U-PHASE FAILURE

——— Iv1    - - - - Iw1

ELECTRIC POWER STEERING DEVICE

CROSS REFERENCE TO RELATED APPLICATIONS

This application is a National Stage of International Application No. PCT/JP2015/074415 filed Aug. 28. 2015, the contents of all of which are incorporated herein by reference in their entirety.

TECHNICAL FIELD

The present invention relates to an electric power steering device wherein a control unit is of a redundant system configuration.

BACKGROUND ART

Among existing electric power steering devices, there is a device such that a motor includes two sets of stator coils, and a control unit includes two sets of inverter circuits that can independently drive the two sets of stator coils, control the two in concert, and when one is abnormal, continue motor drive on the normal side. Also, an electric power steering device such that when there is a short circuit failure of a switching element in a control unit inverter circuit, output on a control side is variably (increased) controlled so as to restrict braking torque caused by the failure, is described in, for example, JP-A-2011-78230 (Patent Document 1). Furthermore, an electric power steering device such that when an open failure occurs in a switching element, a phase in which no failure has occurred continues to be controlled, and a normal side is controlled by a difference in torque between a normal time and a time of failure being corrected, is described in, for example, JP-A-2011-78221 (Patent Document 2).

CITATION LIST

Patent Literature

PTL 1: JP-A-2011-78230
PTL 2: JP-A-2011-78221

SUMMARY OF INVENTION

Technical Problem

The description of the existing devices described in Patent Documents 1 and 2 states to what extent control is continued on the normal side with respect to one failure, but there are various kinds of failure mode in a device formed of a large number of parts, and effective methods may be limited by a configuration of the device. Consequently, there is a need to carry out development of a device with consideration of to what extent control can be continued, or what kind of continued control by the driver will enable a vehicle to continue to be driven, in accordance with differences in failure mode or device configuration. That is, development of a device that realizes a good balance between failure detection and control continuity is desired.

The invention, having been contrived in order to resolve the problem of the heretofore described kind of existing device, has an object of providing an electric power steering device that, in particular, implements a continuity of control based on double failure modes and a device configuration.

Solution to Problem

An electric power steering device according to the invention is an electric power steering device including an electric motor that causes a vehicle steering device to rotate, and a controller that controls the electric motor, the electric motor having a stator including at least two independent sets of coil winding groups, and the controller having a CPU that computes and outputs a control amount and an output portion that can independently drives each winding group of the electric motor, wherein the CPU includes a memory that detects a failure of each region, stores a region in which the failure has occurred and details of the failure for each detected failure, and stores the failure details categorized into at least two kinds of failure mode, and the memory has a failure determination function that, when detecting a first failure, continues control in a normal set in which no failure has been detected, or continues control by combining a portion in which no failure has occurred of a set in which the failure has occurred and the normal set, and when detecting a second or subsequent failure, determines a continuation of control including also a past failure mode and region in which a failure has occurred, and when continuing control, selects a set in which control can be carried out, or continues control by employing one portion of each set in which no failure has occurred.

Advantageous Effects of Invention

According to the electric power steering device according to the invention, regions are divided into sets corresponding to motor winding sets, a region and set in which a failure has occurred, and a failure mode, are stored every time a failure occurs, control is continued on a normal side when a first failure occurs, and control is continued with consideration to previously stored failure details when a second or subsequent failure occurs, because of which the possibility of control continuation increases, and a vehicle can be driven with continued steering wheel assistance. Also, as failure details are stored, there is an advantage useful with regard to failure cause and repair.

Other objects, characteristics, aspects, and advantages of the invention will become more apparent from the following detailed description of the invention, which references the drawings.

DESCRIPTION OF EMBODIMENTS

Figure 1:
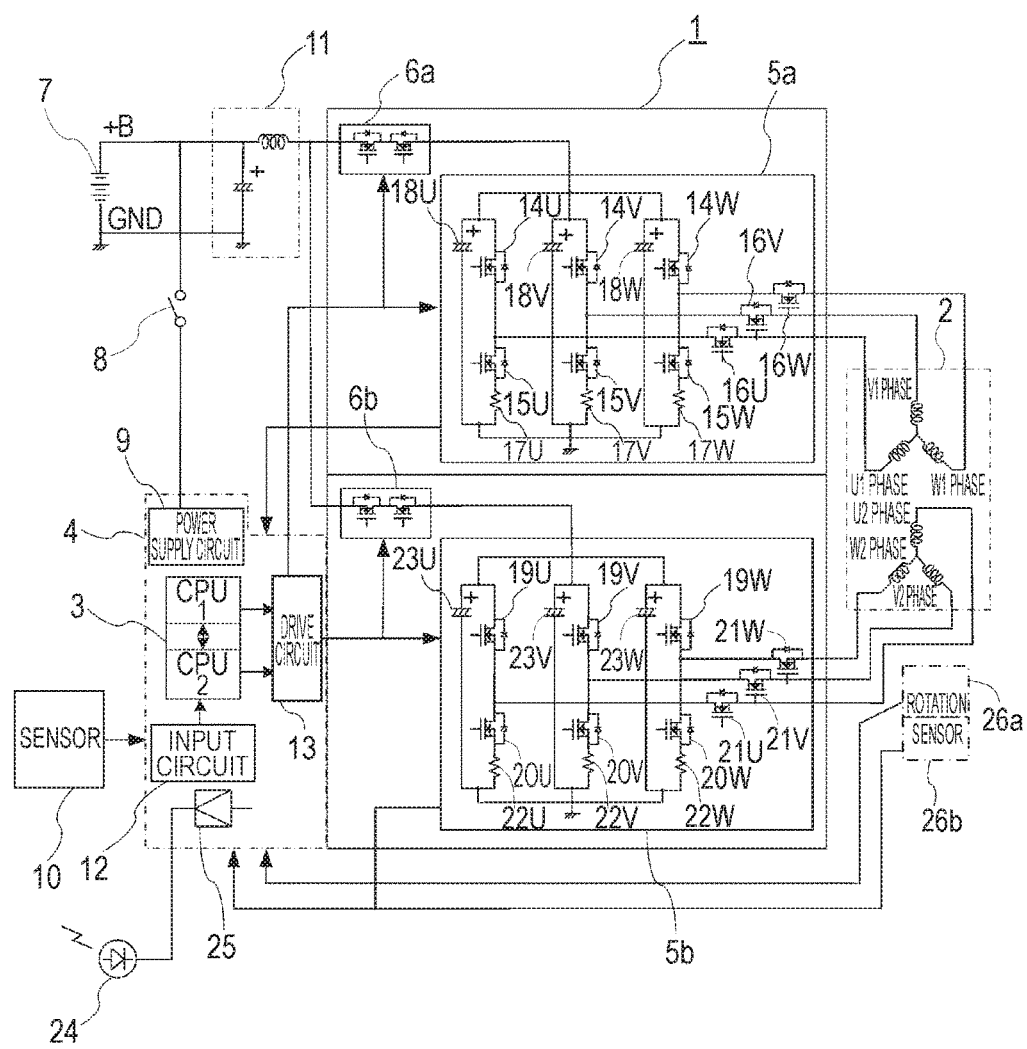
FIG. 1 is an overall circuit diagram of an electric power steering device according to a first embodiment of the invention.

Hereafter, referring to the drawings, preferred embodiments of an electric power steering device according to the invention will be described in detail.

First Embodiment

FIG. 1 is an overall circuit diagram of an electric power steering device. In FIG. 1, reference sign 1 indicates a control unit, reference sign 2 indicates a motor with two sets of three phases, which causes a vehicle steering device to rotate. The control unit 1 is configured to include a control circuit portion 4 in which is mounted a control portion 3 having a CPU as a core (hereafter called the CPU), inverter circuits 5a and 5b, which are main configuration circuits of an output portion, and power supply relays 6a and 6b. Power (+B, GND) is supplied from a battery 7 mounted in a vehicle, and the power is introduced into the control circuit portion 4 via a power supply circuit 9 by an ignition switch 8. Information from a torque sensor mounted in a vicinity of a steering wheel and detecting steering torque, a speed sensor that detects the vehicle speed, and the like, is input into the control circuit portion 4 from a sensor 10. A noise filter 11 is installed in a path of the power (+B, GND).

Information from the sensor 10 is transmitted to the CPU 3 via an input circuit 12 of the control circuit portion 4. From the information, the CPU 3 computes a voltage command value for causing the motor 2 to rotate, and outputs the voltage command value to a drive circuit 13. The drive circuit 13 receives the control values, and outputs a drive signal that drives each switching element of the inverter circuits 5a and 5b.

The inverter circuit 5a is configured to include upper arm switching elements 14U, 14V, and 14W and lower arm switching elements 15U, 15V, and 15W for a 3-phase winding (U1, V1, and W1) of the motor 2, motor relay switching elements 16U, 16V, and 16W that execute connection to and disconnection from the motor windings, current detecting shunt resistors 17U, 17V, and 17W, and furthermore, noise suppressing capacitors 18U, 18V, and 18W.

Also, the inverter circuit 5b is configured in the same way as the inverter circuit 5a. That is, the inverter circuit 5b is configured to include upper arm switching elements 19U, 19V, and 19W and lower arm switching elements 20U, 20V, and 20W for a 3-phase winding (U2, V2, and W2) of the motor 2, motor relay switching elements 21U, 21V, and 21W that execute connection to and disconnection from the motor windings, current detecting shunt resistors 22U, 22V, and 22W, and furthermore, noise suppressing capacitors 23U, 23V, and 23W.

As previously described, the circuit configuration with respect to the winding of each phase of the motor 2, which has two sets of three phases, is the same, and a supply of current can be carried out independently to the winding of each phase of the motor 2. In FIG. 1, the current detecting shunt resistors 17U, 17V, and 17W and 22U, 22V, and 22W are installed in the lower arm switching elements 15U, 15V, and 15W and 20U, 20V, and 20W respectively, but current detecting shunt resistors may be installed in a vicinity of the upper arm switching elements 14U, 14V, and 14W or in a bus line.

Also, although not shown in FIG. 1, a difference in potentials across the shunt resistors 17U, 17V, and 17W and 22U, 22V, and 22W and, for example, a motor winding terminal voltage and the like are also transmitted to the input circuit 12. A configuration is such that these items of information are also input into the CPU 3, a difference between a computed current value and a detected value is computed, and a so-called feedback control is carried out, whereby a desired motor current is supplied, and steering force is assisted. Drive signals for the power supply relays 6a and 6b are also output from the drive circuit 13, and a supply of current to the motor 2 can be interrupted by switching elements configuring the power supply relays 6a and 6b. In the same way, the CPU 3 also carries out control of the motor relay switching elements 16U, 16V, and 16W and 21U, 21V, and 21W, and can also cut off each phase independently.

The CPU 3 has a failure determination function portion that detects a failure of the inverter circuits 5a and 5b, the motor 2 windings, and furthermore, each circuit and the like, from the items of information input, and when a failure is detected, the motor relay switching elements 16U, 16V, and 16W or 21U, 21V, and 21W are turned off in order to interrupt the supply of current to, for example, only a predetermined phase in response to the failure. Alternatively, the power supply relays 6a and 6b can be turned off in order to interrupt the power supply at source. Furthermore, when a failure is detected, a signal is output from the CPU 3 via an output circuit 25 so as to cause an alarm portion, for example, an LED 24, to light up. The power supply relays 6a and 6b may be incorporated in the inverter circuits 5a and 5b respectively.

A brushless motor such that the two sets of 3-phase windings are star-connected is used as the motor 2. As the motor 2 is a brushless motor, rotation sensors 26a and 26b that detect a rotational position of a rotor are mounted. The rotation sensors 26a and 26b are also such that two sets of sensors are mounted separately in order to maintain a redundant system, and rotation information from the rotation sensors 26a and 26b is transmitted separately to the input circuit 12 of the control circuit portion 4. A delta connection, or a brushed motor with two pairs of poles, may be used instead of a 3-phase star-connected brushless motor. Also, with regard to winding specifications, a winding may be such that each phase is provided with a phase difference, or a so-called multi-phase (6-phase) winding with no phase difference may be employed.

As heretofore described, the control unit 1 is of a configuration that can control the motor 2 using independently input information, computed values, and detected values. In FIG. 1, the CPU 3 and drive circuit 13 are shown as single parts, but a configuration having two CPUs (CPU 1 and CPU 2) and two drive circuits, corresponding one each to the inverter circuits 5a and 5b, may be adopted. Also, a configuration having two independent power supply circuits 9, one for each CPU 3 and drive circuit 13, may be adopted.

Failure modes of the device configured as heretofore described will be considered in detail. Firstly, a failure occurring in the noise filter 11 or power supply circuit 9 will be considered. As a failure mode, it is imagined that a predetermined power cannot be supplied. When the predetermined power cannot be supplied, there is no guarantee that normal control can be carried out, even though other parts are normal, because of which the failure mode is determined to be a more serious second failure mode, which affects other regions. An open failure of a coil of the noise filter 11 or a capacitor short circuit failure is equivalent to not being able to supply the predetermined power, but in a case of a coil short circuit or a capacitor open failure, the predetermined power can be supplied, because of which this kind of mode is determined to be a first failure mode, which is relatively minor when compared to the second failure mode.

In the same way, a failure in a peripheral circuit such as the drive circuit 13 or input circuit 12 will be considered. An open failure is considered to be a mode such that a desired signal is not transmitted, while a short circuit failure is considered to be a mode such that a predetermined voltage or potential level is unchanging. Whichever the mode, control cannot be continued when information thereof is essential for continuing control, but control can be continued when the information can be substituted with other information. Because of this, a failure is stored categorized as the more minor first failure mode or the serious second failure mode, depending on the extent of the effect of the failure.

In the same way, the power supply relays 6a and 6b and motor relay switching elements 16U, 16V, and 16W or 21U, 21V, and 21W will be considered. These include a multiple of parts, but when summarizing in terms of the extent of the effect of a failure mode, categorization into open mode and short circuit mode is possible. That is, almost all open mode failures are such that a predetermined signal is not transmitted, and are categorized as the second failure mode, which affects other regions. Meanwhile, almost all short circuit mode failures are a condition of being connected in terms of current, and it is rare that this kind of failure also affects other regions, because of which the failure is categorized as the first failure mode. Also, the inverter circuits 5a and 5b can also be categorized into the same kinds of open failure and short circuit failure. However, not only switching elements but also capacitors and shunt resistors exist, because of which an open failure and short circuit failure cannot easily be categorized into the first failure mode or second failure mode.

For example, in a case of an open failure in the noise suppressing capacitors 18U, 18V, and 18W or 23U, 23V, and 23W, there is no effect on control of the motor 2, because of which the failure is categorized as the first failure mode. In a case in which a short circuit failure occurs in one of the upper arm switching elements 14U, 14V, 14W, 19U, 19V, and 19W or lower arm switching elements 15U, 15V, 15W, 20U, 20V, and 20W, another switching element connected in series thereto is controlled so as to be turned on, a large current flows, and it is supposed that not only the switching element but also a peripheral part is affected. Because of this, the failure is categorized as the second failure mode. Meanwhile, in the case of an open failure, motor control while the switching element is being turned on is such that the desired rotation cannot be carried out, but provided that other parts are all normal, the rotation of the motor 2 can be continued using the remaining parts. Because of this, the failure is categorized as the first failure mode. Furthermore, short circuit failure also includes a supply fault or ground fault to the power supply or ground, and when this kind of failure occurs, the failure is normally categorized as the second failure mode, regardless of the part affected. Hereafter, these two kinds of failure mode will be taken into consideration.

When considering a failure mode of the CPU 3, a case in which only one input or output port fails is categorized as the first failure mode, which does not affect other regions, but a case in which a result of just one failure affects a control amount or stored value, as with a failure of a core portion in an interior of the CPU 3, for example, a computing portion or memory portion, is categorized as the second failure mode. Furthermore, when the CPU 3 is configured of two CPUs (CPU 1 and CPU 2), values held by the two can be exchanged, and the two can carry out a mutual comparative verification. Furthermore, the CPU 3 is such that not only is the failure mode categorized every time a failure is detected, but the fact that a multiple of failures have occurred is also stored. Also, which set of the two sets of coil windings the failure has occurred in is also stored. That is, there are four divisions, those being the set in which the failure occurs, the region in which the failure occurs, the failure mode, and the failure occurrence order. The failure detection, categorization, and storage can all be achieved in the interior of the CPU 3.

Next, a description will be given of a control method after a failure occurs.

Firstly, as a simplest method when a first failure is detected, control of the set in which the failure occurs is stopped, regardless of whether the failure mode is the first or second. Further, control of the set on the normal side only is continued. Next, when a second failure is detected, a method of continuing control is changed in accordance with details of the failure, and the set in which the failure occurs. That is, when the first or second failure mode occurs a second time in the same set as the first failure, control is being continued only on the normal side, so this is continued.

When the second failure occurs in another set, consideration includes the failure mode thereof and the first failure. The following four kinds are conceivable as combinations.

(1) First+ first failure mode
(2) First+ second failure mode
(3) Second+ first failure mode
(4) Second+ second failure mode In the case of the failure modes in (1) above, both are first failure modes, and control of either set may be continued. Alternatively, the set in which continued control nearer to that of a normal time can be carried out, despite the first failure mode, can be employed. Furthermore, by continuing control of only portions of the two sets that can be controlled, control can be continued by the two in tandem. For example, when an open failure occurs in the switching element (14U or 15U) of one of the three phases, two-phase drive can be carried out using only one set, or two phases of each of the two sets can be driven. Furthermore, both sets can be driven when a large amount of power steering assist force is needed, and only one set driven when a small amount of assist force is sufficient.

Next, the cases of the failure modes in (2) and (3) above are identical as failure modes, although the order of occurrence differs. Consequently, as one failure mode is the second failure mode, control of the set on the side of the second failure mode is stopped, and the first failure mode of the other set is driven. That is, the first failure mode is employed with priority.

The case of the failure modes in (4) above is serious as a failure mode, because of which control is stopped in the worst case scenario. Also, when an order of priority can be applied for continuing control in accordance with the failed region, even though both are second failure modes, continuation of control is carried out in accordance with the order of priority. For example, taking a case of a set one wherein there is a short circuit failure in the upper arm switching element 14U and a set two wherein there is a supply fault or ground fault in the motor windings, the motor winding failure is more serious in that rotation of the motor 2 cannot be controlled. Because of this, the set one is employed, and the supply of current to the motor windings can be continued using two-phase drive, bearing in mind that the upper arm switching element 14U is short-circuited. That is, this kind of failure is such that control is continued as far as possible by employing the set one.

Figures 2, 3:
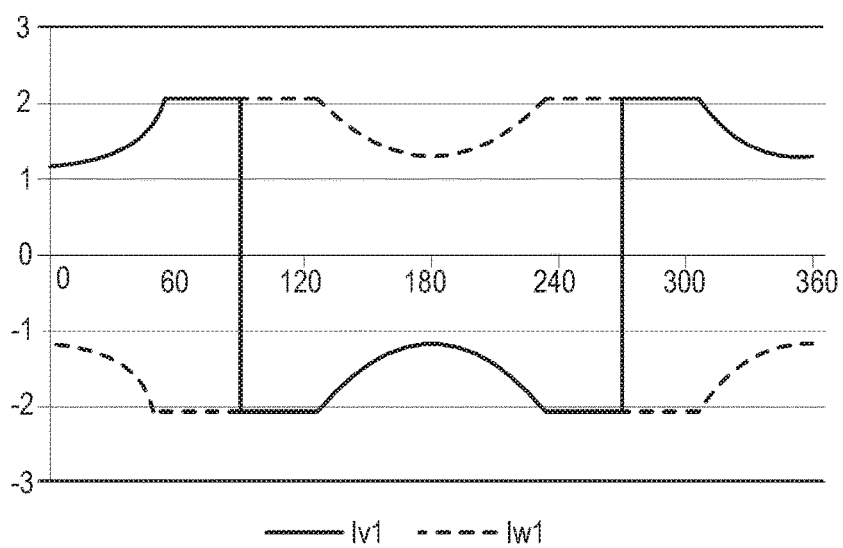
FIG. 2 is a failure memory diagram of the electric power steering device according to the first embodiment of the invention.
FIG. 3 is a diagram showing a current value with respect to a rotation angle of an electric power steering device according to a second embodiment of the invention.

Storage details when a failure occurs in the CPU 3 are shown in FIG. 2. FIG. 2 simulates one portion of a memory in the interior of the CPU 3. Reference signs 30 to 32 represent columns while reference signs 33 to 37 represent rows, and these correspond to addresses Add1 to Add4. Reference sign 33 is a title row for the sake of the description, and does not exist in the memory. The column 30 of the address Add1 is a place for storing a relevant set, and a region in which a failure occurs is indicated in the column 31 of the address Add1 with, for example, a part name shown in FIG. 1 being stored. The column 32 of the address Add1 is a memory for storing a failure mode, wherein one of the first and second failure modes is stored. In the same way, the address Add2 is for a failure occurring second, the address Add3 is for a third failure, and the address Add4 is for a fourth failure.

Next, a description will be given of storage when a failure with details shown in the example of FIG. 2 occurs, and of a countermeasure thereto.

The first failure is stored in the address Add1 row, and the matter that the upper arm switching element 14U has been detected as failing in the first failure mode on the side corresponding to the winding of set one is stored. As a failure has occurred here, control of the set one side is stopped, and control is continued only on the normal set two side. Subsequently, the second failure occurs, and details thereof are stored in the address Add2. In this case too, it is shown that the first failure mode has been detected in the lower arm switching element 15U in the set one, and stored. These failures occur successively without being repaired, and data thereof are cleared after every repair after the failures occur. Also, there is no dependence on a turning on and off of the ignition switch 8. That is, provided that there is no repair, the data are held regardless of whether or not there is a power supply.

As the second failure occurs in the same set as the first, continued control is implemented in the same way on the set two side. Next, the third failure occurs, and details thereof are stored in the address Add3 row. Herein, it is shown that the power supply relay 6b is stored as being in the second failure mode on the set two side. The third failure has occurred in the set two, which has been the normal side thus far, and moreover, has occurred in the second failure mode. When comparing the set one and set two in terms of control continuation, it is seen that failures have occurred in two regions in the set one, but the failures are of the first failure mode, and moreover, have occurred in the same U-phase. That is, regions corresponding to the remaining V-phase and W-phase remain normal. Meanwhile, the power supply relay 6b has failed in the set two, and moreover, the failure is of the second failure mode, which is more serious. Because of this, when thinking in terms of control continuation, continuing control of the set one is more likely to enable assistance execution, that is, enable the motor 2 to rotate. Therefore, control is moved to the set one side after the third failure occurs, and motor drive is continued by driving with the two phases other than the U-phase.

Furthermore, the fourth failure occurs, and is stored in the address Add4 row. This is a case wherein a failure occurs in the set two in the second failure mode, and is a case wherein the second failure mode has occurred in both sets. Because of this, continued control can no longer be carried out, and control is stopped.

Functioning is such that the set and region in which the failure occurs, and the failure mode, are stored on every detection, and when the second or subsequent failure occurs, a method that enables control to be continued is determined and employed, with consideration to past failure modes, regions, and sets.

Although there is a need to notify a driver of the occurrence of a failure, notification can be carried out using the LED 24, which is an alarm portion. At this time, the driver can be informed of a failure level of the first to fourth failure occurrences by changing a notification method. That is, the LED 24 is lit up for the address Add1, and caused to flash in differing modes for the addresses Add2 to Add4. By so doing, the driver can also ascertain the number of failures, and knows a degree of urgency of conveying a vehicle to a repair shop. Because of this, it is good when in the region of three kinds are prepared, those being a first control continuation, a second control continuation or control continuation differing from the first control continuation, and furthermore, a control stoppage. Also, as failure details are stored in the memory of FIG. 2, where the failure has occurred can be ascertained at the repair shop, which has an advantage useful with regard to failure cause and repair.

The failure detection method implemented by the CPU 3 depends on region, and determination is carried out by monitoring individual voltage values or current values when a region is driven or not driven. Also, there is also a failure that is ascertained by checking only when the power is introduced or the ignition is turned on, and when there is also a region, a failure that is ascertained by monitoring during control, which method is the same as that of an existing device.

According to the electric power steering device according to the first embodiment, as heretofore described, regions are divided into sets corresponding to motor winding sets, a region and set in which a failure has occurred, and a failure mode, are stored every time a failure occurs, control is continued on a normal side when a first failure occurs, and control is continued with consideration to previously stored failure details when a second or subsequent failure occurs, because of which the possibility of control continuation increases, and a vehicle can be driven with continued steering wheel assistance. Also, as failure details are stored, there is an advantage useful with regard to failure cause and repair.

Second Embodiment

Next, an electric power steering device according to a second embodiment of the invention will be described. As a configuration of the electric power steering device according to the second embodiment is practically the same as that in the first embodiment, an illustration thereof is omitted from the drawings.

The control unit 1 may be of a configuration that has two CPUs that are incorporated in the same package. In this case, the two CPUs are connected by a line capable of communication, and by the CPUs using communication to exchange conditions such as an existence or otherwise of an abnormality occurrence or a sharing ratio, each CPU can ascertain the conditions of the other, and reflect the conditions in control of the CPU itself.

Even in a case of a single CPU, a redundant system can be formed by a software configuration being independent, and a control command value and other results thereof also being stored separately. Also, an output port being separated into a differing port for the drive circuit 13 means that even when one port becomes abnormal, output can be continued from the other port. By the CPU 3 of the control circuit portion 4 being integrated into one, there is an advantage in that a scale thereof can be reduced in comparison with that of the first embodiment, and measures against communication errors caused by noise and the like can be strengthened by eliminating the communication line.

Furthermore, a description will be given of a specific example wherein a limit current is increased when one CPU 3 is abnormal. In the first embodiment, a description has been given of allotting, but a description will be given here of a current value actually controlled.

Current flowing in three phases at a normal time is obtained from Expression (1) using an effective current value Irms.

$$\begin{cases} I_u = \sqrt{2}\,I_{rms}\sin(\theta - \pi) \\ I_v = \sqrt{2}\,I_{rms}\sin\left(\theta + \frac{\pi}{3}\right) \\ I_w = \sqrt{2}\,I_{rms}\sin\left(\theta - \frac{\pi}{3}\right) \end{cases} \quad (1)$$

Induction voltage is obtained from Expression (2)

$$\begin{cases} e_u = K_e\omega\sin(\theta - \pi) \\ e_v = K_e\omega\sin\left(\theta + \frac{\pi}{3}\right) \\ e_w = K_e\omega\sin\left(\theta - \frac{\pi}{3}\right) \end{cases} \quad (2)$$

A relationship between motor torque Tm, three phases of current Iu, Iv, and Iw, and three phases of induction voltage eu, ev, and ew is obtained from Expression (3).

$$T_m\omega = I_u e_u + I_v e_v + I_w e_w \quad (3)$$

When Expression (1) and Expression (2) are substituted for Expression (3), the motor torque Tm is obtained from Expression (4).

$$T_m = \frac{3}{\sqrt{2}} K_e I_{rms} \quad (4)$$

Meanwhile, when an open failure occurs in the U1 phase, no current flows in the U-phase, because of which Expression (5) is established.

$$\begin{cases} I_u = 0 \\ I_w = -I_v \end{cases} \quad (5)$$

At this time, the motor torque is obtained from Expression (6).

$$T_m = \sqrt{3} K_e I_v \cos\theta \quad (6)$$

That is, in order to output the motor torque Tm, it is sufficient that a V-phase current is set as in Expression (7).

$$I_v = \frac{T_m}{\sqrt{3}\, K_e \cos\theta} \quad (7)$$

For example, a motor with no saliency such as a rotary field synchronized motor (SPM motor), having a form wherein a magnet is bonded to a rotor surface, is such that the motor torque Tm can be expressed as in Expression (8) with respect to a q-axis current Iq.

$$T_m = \sqrt{\frac{3}{2}} K_e I_q \quad (8)$$

Also, the q-axis current Iq when the kind of 3-phase current in Expression (1) flows is expressed by Expression (9).

$$I_q = \sqrt{3} I_{rms} \quad (9)$$

When Expression (9) is substituted for Expression (7), the V-phase current needed at a time of an open failure due to the q-axis current Iq is obtained from Expression (10).

$$I_v = \sqrt{\frac{3}{2}} \frac{I_{rms}}{\cos\theta} \quad (10)$$

When the V-phase current is controlled as in Expression (10) when an open failure occurs in the U-phase, a V-phase current Iv and W-phase current Iw are as in FIG. 3. In FIG. 3, a horizontal axis represents a rotation angle of the motor 2, and a vertical axis represents a current ratio when the effective current value at a normal time is 1, but the current ratio can also be seen as an output torque ratio. Herein, as one of the three phases is stopped, it is supposed that there is leeway with respect to heat capacity, and a maximum value of the effective current value Irms when a failure occurs is taken to be 1.5 times that at a normal time. Taking output torque of each group at a normal time to be 1, the output torque is as in FIG. 4. The output torque decreases in a vicinity of 90 degrees and a vicinity of 270 degrees, becoming zero at 90 degrees and 270 degrees. Herein, although the maximum value of the effective current value Irms when a failure occurs is taken to be 1.5 times that at a normal time, the maximum value may be set in accordance with a tolerable heat capacity. When set to be equivalent to that at a normal time, the maximum value is as in FIG. 5, and a range wherein a limit is applied and the output torque decreases increases. That is, the greater the effective current value Irms when a failure occurs, the wider the range in which the output torque can be secured.

Figure 6:
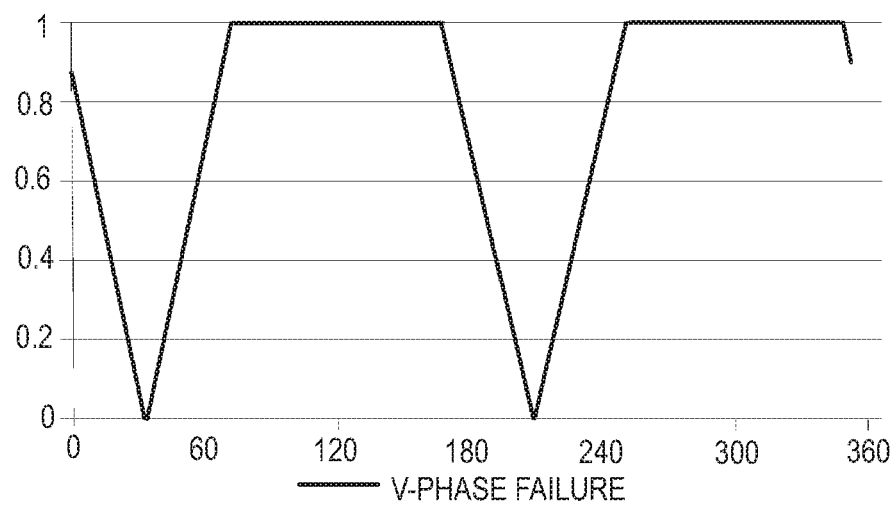
FIG. 6 is a diagram showing output torque when a failure occurs in a V-phase of the electric power steering device according to the second embodiment of the invention.

Also, the output torque is as in FIG. 6 when an open failure occurs in the V-phase, decreasing in a vicinity of 30 degrees and a vicinity of 210 degrees, and becoming zero at 30 degrees and 210 degrees. The output torque is as in FIG. 7 when an open failure occurs in the W-phase, decreasing in a vicinity of 150 degrees and a vicinity of 330 degrees, and becoming zero at 150 degrees and 330 degrees.

A description will be given of a case wherein an open failure occurs in one of the three phases in each group, for example, when an open failure occurs in the U-phase upper arm switching element 14U of the inverter circuit 5a and the U-phase upper arm switching element 19U of the inverter circuit 5b, in the motor 2, wherein there are two groups and a phase difference of 30 degrees.

Current flowing in three phases at a normal time is obtained from Expression (11) using the effective current value Irms.

$$\begin{cases} I_{u1} = \sqrt{2}\, I_{rms} \sin(\theta - \pi) \\ I_{v1} = \sqrt{2}\, I_{rms} \sin\left(\theta + \frac{\pi}{3}\right) \\ I_{w1} = \sqrt{2}\, I_{rms} \sin\left(\theta - \frac{\pi}{3}\right) \\ I_{u2} = \sqrt{2}\, I_{rms} \sin\left(\theta + \frac{5}{6}\pi\right) \\ I_{v2} = \sqrt{2}\, I_{rms} \sin\left(\theta + \frac{\pi}{6}\right) \\ I_{w2} = \sqrt{2}\, I_{rms} \sin\left(\theta - \frac{\pi}{2}\right) \end{cases} \quad (11)$$

Figure 8:
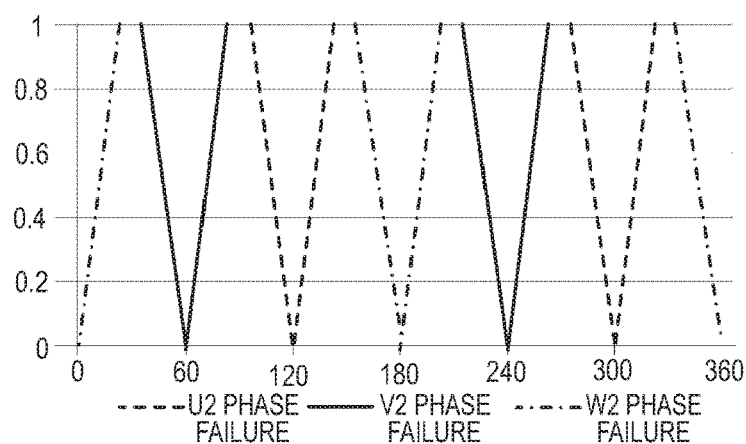
FIG. 8 is a diagram showing output torque when a failure occurs in each phase of the electric power steering device according to the second embodiment of the invention.

When an open failure occurs in a U2 phase, V2 phase, or W2 phase, the output torque, by the same thinking as previously described, is as in FIG. 8. That is, when a phase in which an open failure has occurred exists in each group, an angle at which the torque becomes zero occurs twice in one cycle, regardless of whether operation is continued in the group in which the open failure occurred first or operation is continued in the group in which the open failure occurred later.

Figure 4:
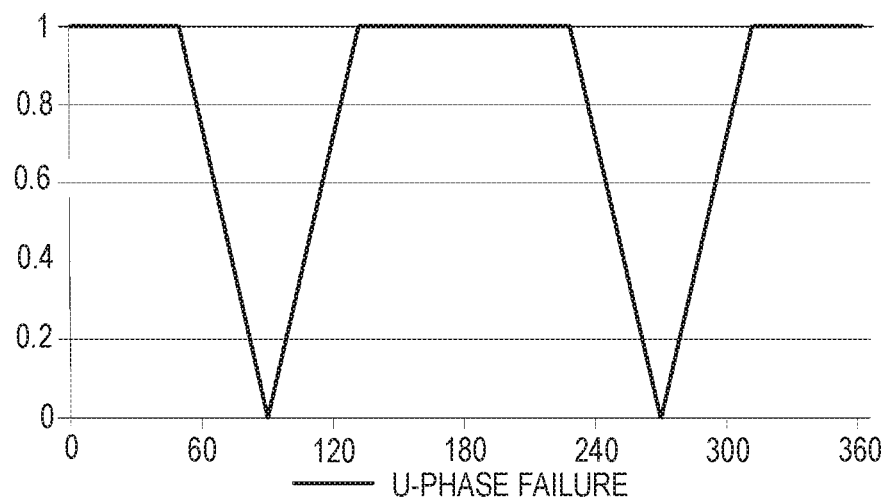
FIG. 4 is a diagram showing output torque when a failure occurs in a U-phase of the electric power steering device according to the second embodiment of the invention.
Figure 5:
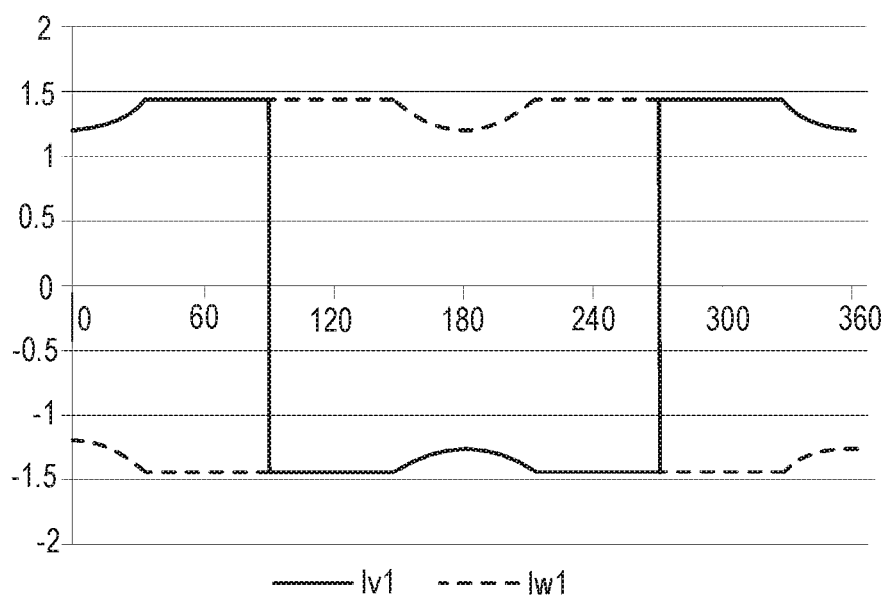
FIG. 5 is a diagram showing a current value with respect to a rotation angle of the electric power steering device according to the second embodiment of the invention.
Figure 7:
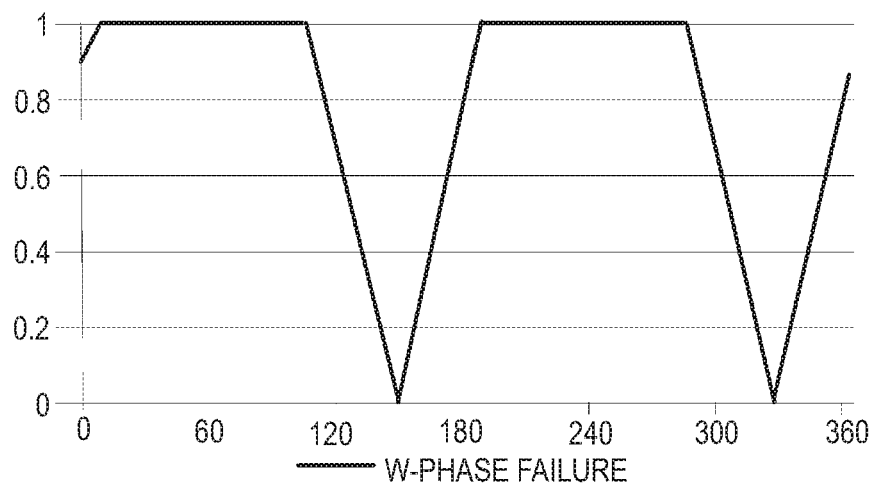
FIG. 7 is a diagram showing output torque when a failure occurs in a W-phase of the electric power steering device according to the second embodiment of the invention.

Herein, as can be seen by comparing FIG. 4, FIG. 6, and FIG. 7 with FIG. 8, the angle at which the output torque becomes zero differs in all six phases owing to the effect of the 30 degree phase difference. In the second embodiment, when an open failure occurs in both groups, this quality is utilized to continue operation using a total of four phases other than the phases in which the failure has occurred.

Figure 9:
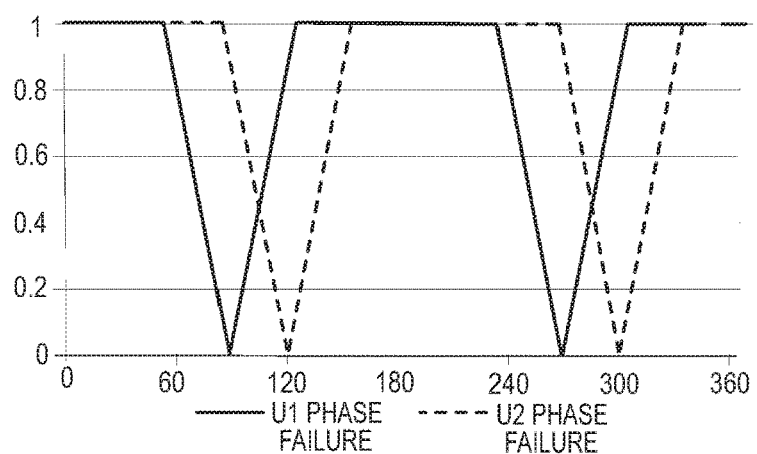
FIG. 9 is a diagram showing output torque when failures occur in a U1 phase and U2 phase of the electric power steering device according to the second embodiment of the invention.
Figure 10:
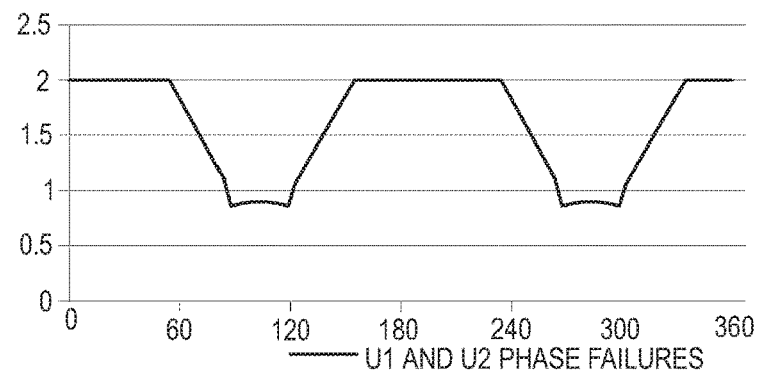
FIG. 10 is a diagram showing output torque when failures occur in the U1 phase and U2 phase of the electric power steering device according to the second embodiment of the invention.
Figure 11:
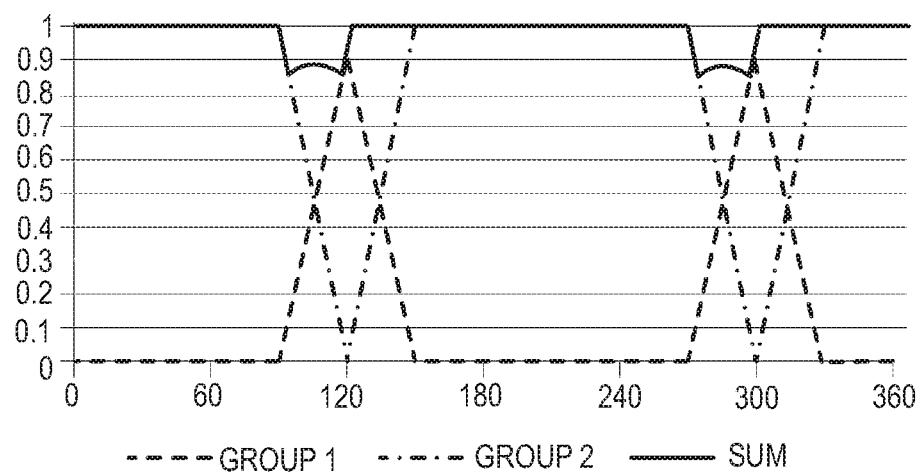
FIG. 11 is a diagram showing output torque when failures occur in the U1 phase and U2 phase of the electric power steering device according to the second embodiment of the invention.

The output torque in each group when an open failure occurs in the U1 phase and U2 phase is as in FIG. 9, and a maximum value of a sum of the output torques of the two groups is as in FIG. 10. For example, when output torques such as those in FIG. 11 are secured in each group, there is a torque decrease of in the region of 10% when the sum of the output torques is in a range of 88 degrees to 122 degrees or 268 degrees to 302 degrees, but the output torque is 1 in ranges other than these. By continuing operation using a normal phase of each group when an open failure occurs in one phase each in each group in the motor 2, wherein there is a phase difference between groups, the output torque decrease can be reduced to in the region of 10% in one portion of ranges with respect to a time of a failure in one group when the output torque of 1 is maintained by continuing operation in only the normal group. Herein, output torque is gained in a group one too when the output torque is insufficient only in a group two, but as thermal bias occurs, it goes without saying that a load balance between group one and group two may be adjusted with time, angle, and the like as conditions.

Figure 12:
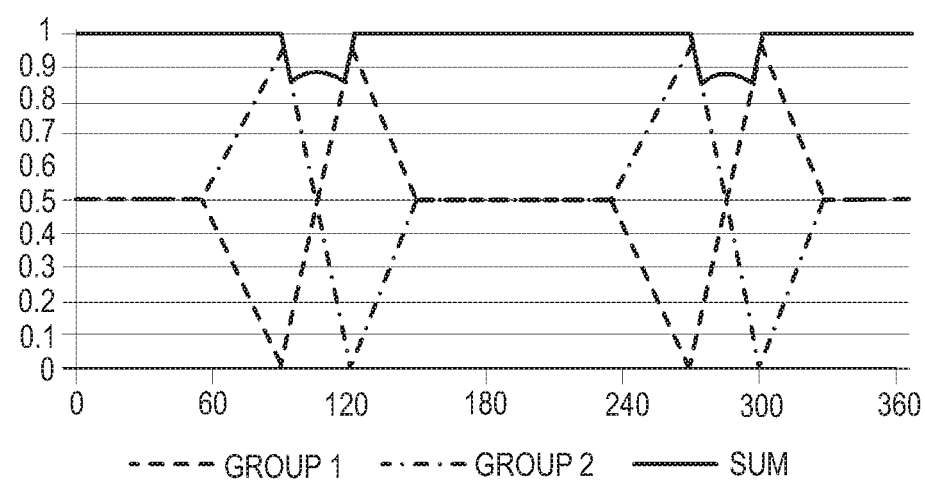
FIG. 12 is a diagram showing output torque when failures occur in the U1 phase and U2 phase of the electric power steering device according to the second embodiment of the invention.
Figure 13:
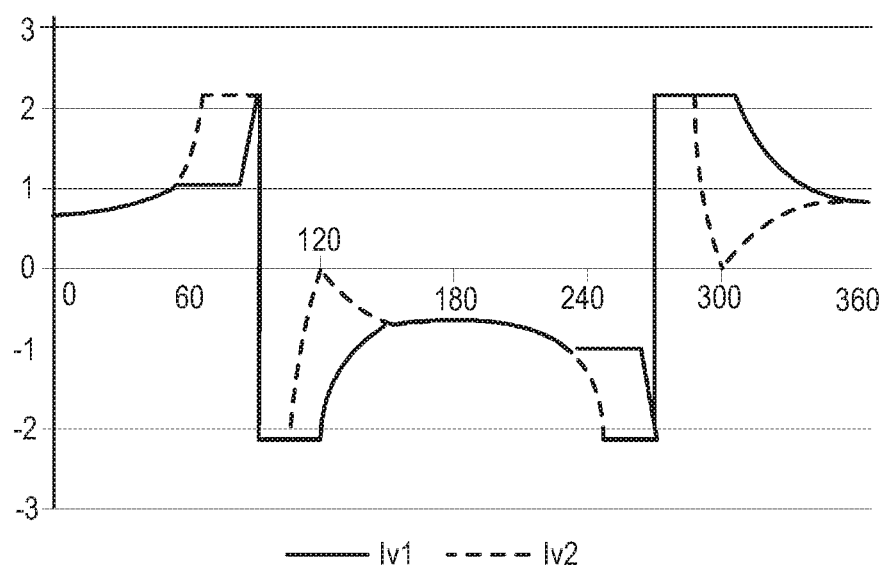
FIG. 13 is a diagram showing a current value when failures occur in a V1 phase and V2 phase of the electric power steering device according to the second embodiment of the invention.
Figure 14:
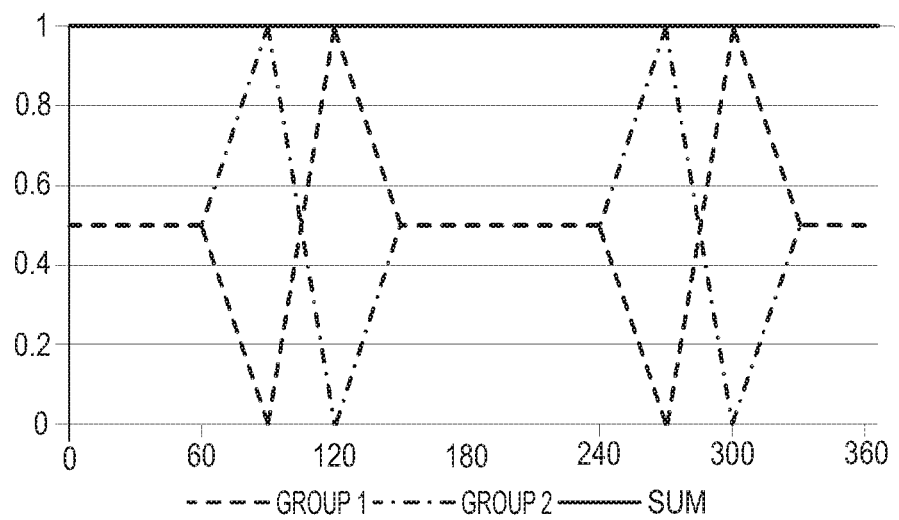
FIG. 14 is a diagram showing output torque when failures occur in the U1 phase and U2 phase of the electric power steering device according to the second embodiment of the invention.

Output torque in an example wherein a load is distributed equally between group one and group two in order to restrict thermal bias is shown in FIG. 12, and currents of the V1 phase and V2 phase are shown in FIG. 13. Output torque is maintained at approximately 50% each in group one and group two, and in a region in which the output torque of one group decreases considerably due to the effect of an open failure, the same output torque sum as in FIG. 11 can be obtained by the current of the other group being increased. In FIG. 11 to FIG. 13, in the same way as in FIG. 3, the maximum value of the effective current value Irms when there is a failure is taken to be 1.5 times that at a normal time, but when there is leeway in the heat capacity, the output torque 1 can be maintained in all regions, as in FIG. 14, by setting the maximum value at $\sqrt{3}$ times that at a normal time.

As heretofore described, when failures of the same degree, particularly first failure modes, occur in differing places, there is no difference between the failure modes, because of which control of the place in which the failure has occurred in each set is stopped rather than control being continued in only one set, and drive is continued using other normal places, whereby the failure can be countered more appropriately. Also, by increasing the limit current value of the drive when a failure occurs, the supply of current to the motor is continued increased, if only by a little, because of which steering power assist can be maintained as far as possible, and steering performance is maintained, whereby a power steering device with a high degree of safety can be provided.

Heretofore, first and second embodiments of the invention have been described, but the embodiments can be freely combined, and each embodiment can be modified or abbreviated as appropriate, without departing from the scope of the invention.

The invention claimed is:

1. An electric power steering device, comprising:
   an electric motor that causes a vehicle steering device to rotate; and
   a controller that controls the electric motor, the electric motor having a stator including at least two independent sets of coil winding groups, and the controller having a CPU that computes and outputs a control amount and a drive circuit that independently drives each winding group of the electric motor, wherein
   the CPU includes a memory that detects a failure of each region, stores a region in which the failure has occurred and details of the failure for each detected failure, and stores the failure details categorized into at least two kinds of failure mode, and
   the memory has a failure determination function that, when detecting a first failure, continues control in a normal set in which no failure has been detected, or continues control by combining a portion in which no failure has occurred of a set in which the failure has occurred and the normal set, and when detecting a second or subsequent failure, determines a continuation of control including also a past failure mode and region in which a failure has occurred, and when continuing control, selects a set in which control can be carried out, or continues control by employing one portion of each set in which no failure has occurred.

2. The electric power steering device according to claim 1, wherein the failure determination function has two kinds of failure mode, those being a first mode and a second mode, the first mode acts only in a region in which the failure has occurred, or is a minor failure mode that can be substituted, and the second mode is such that the failure affects not only a region in which the failure has occurred but also another region, or is a serious failure mode compared with the first mode that can be substituted.

3. The electric power steering device according to claim 2, wherein the failure determination function, when detecting a second or subsequent failure, selects the first mode with priority, including also a past failure mode and region and set in which a failure has occurred.

4. The electric power steering device according to claim 2, wherein the failure determination function stops control when a plurality of failures are failures of the same second mode, a failure occurs in each set, and there is no difference between regions in which the failures occur.

5. The electric power steering device according to claim 2, wherein the failure determination function, taking a region in which a failure has occurred into consideration, employs a set nearer to control at a normal time, or employs one portion of both sets, when detecting that a plurality of failures are failures of the same first mode.

6. The electric power steering device according to claim 1, wherein the failure determination function, when carrying out a continuation of control in accordance with the failure mode, stops control of one portion affected by a failure, and continues control by increasing current of a set to be continued beyond that at a normal time.

7. The electric power steering device according to claim 3, wherein the failure determination function has an alarm portion having at least two kinds of alarm detail, those being a continuation of control when a first failure occurs, and a continuation of control when a second or subsequent failure occurs that differs from the first continuation of control.

\* \* \* \* \*